(12) United States Patent
Xie

(10) Patent No.: US 10,233,032 B1
(45) Date of Patent: Mar. 19, 2019

(54) MATERIAL DELIVERY METHOD AND APPARATUS FOR VERTICAL DISTRIBUTION

(71) Applicant: Alex Xie, West Windsor, NJ (US)

(72) Inventor: Alex Xie, West Windsor, NJ (US)

( * ) Notice: Subject to any disclaimer, the term of this patent is extended or adjusted under 35 U.S.C. 154(b) by 0 days.

(21) Appl. No.: 16/038,238

(22) Filed: Jul. 18, 2018

(51) Int. Cl.
| | |
|---|---|
| *B65G 47/40* | (2006.01) |
| *B65G 47/46* | (2006.01) |
| *B65G 47/18* | (2006.01) |

(52) U.S. Cl.
CPC ............. *B65G 47/40* (2013.01); *B65G 47/18* (2013.01); *B65G 47/46* (2013.01)

(58) Field of Classification Search
CPC ....... B29C 31/004; B29C 31/02; B29C 31/04; B29C 31/08; B29C 31/085; B29C 31/10; B29C 39/24; B65G 65/23; B65G 65/32; B65G 65/42; B65G 65/425
See application file for complete search history.

(56) References Cited

U.S. PATENT DOCUMENTS

| | | |
|---|---|---|
| 1,597,103 A | 8/1926 | Oberherr |
| 1,735,674 A | 11/1929 | Copeland |
| 1,935,985 A | 11/1933 | Oberherr |
| 1,949,517 A | 3/1934 | Van Der Pyl |
| 2,044,585 A | 6/1936 | Macht |
| 2,140,197 A | 12/1938 | Batcheller |
| 3,088,713 A | 5/1963 | Gard |
| 3,216,464 A * | 11/1965 | Horst ...................... B29C 31/10 141/11 |
| 3,318,984 A | 5/1967 | Dussel |
| 3,601,161 A * | 8/1971 | Buhrer ...................... B22C 5/12 141/107 |
| 4,013,616 A | 3/1977 | Wallace |
| 4,209,486 A | 6/1980 | Ross |
| 4,343,752 A | 8/1982 | Cann |
| 4,399,904 A * | 8/1983 | Canziani .............. B65G 47/962 104/140 |
| 4,846,335 A * | 7/1989 | Hartlepp .............. B65G 47/962 198/370.04 |
| 5,266,253 A | 11/1993 | Dijkhuizen |
| 5,795,513 A | 8/1998 | Austin |
| 5,885,503 A | 3/1999 | Bordener |
| 6,082,827 A * | 7/2000 | McFall ................ B65G 47/967 298/17.6 |

(Continued)

FOREIGN PATENT DOCUMENTS

FR 002627424 A1 8/1989

*Primary Examiner* — Glenn F Myers
(74) *Attorney, Agent, or Firm* — Walter J. Tencza, Jr.

(57) ABSTRACT

An apparatus including a delivery device including a tray, and a device for changing the tray from a receiving state to a dumping state; a device for supplying one or more materials to the delivery device, while the tray of the delivery device is in a receiving state; a track device including a track and a motor; and a mold having an elongated opening, wherein the delivery device is configured to move back and forth on the track of the track device in response to the motor of the track device; wherein the track of the track device is substantially parallel to the elongated opening of the mold; and wherein the device for changing the tray from the receiving state to the dumping state causes one or more materials to fall from the tray through the elongated opening of the mold into an inner chamber of the mold.

17 Claims, 14 Drawing Sheets

(56) References Cited

U.S. PATENT DOCUMENTS

| | | |
|---|---|---|
| 6,517,915 B1 | 2/2003 | Banus |
| 6,616,874 B1 * | 9/2003 | Lazar ................ B28B 3/022 |
| | | 264/245 |
| 6,702,967 B2 | 3/2004 | Overholt et al. |
| 8,353,146 B1 * | 1/2013 | Bareford ............. B65B 25/00 |
| | | 53/127 |
| 8,436,075 B2 | 5/2013 | Buskila et al. |
| 8,702,886 B2 | 4/2014 | Yaniv et al. |
| 9,186,819 B1 | 11/2015 | Grzeskowiak, II |
| 9,409,726 B2 * | 8/2016 | Pape ..................... B65B 3/06 |
| 9,511,516 B2 | 12/2016 | Xie |
| 9,707,698 B1 | 7/2017 | Xie |
| 9,718,303 B2 | 8/2017 | Greskowiak, II et al. |
| 2002/0056607 A1 * | 5/2002 | Bonnet ............... B65G 17/345 |
| | | 198/370.05 |
| 2004/0175514 A1 | 9/2004 | Stiattesi |
| 2006/0101752 A1 | 5/2006 | Sakai |
| 2012/0283384 A1 | 11/2012 | Cox |
| 2014/0127450 A1 | 5/2014 | Riman |
| 2016/0089818 A1 * | 3/2016 | Xie ..................... B29C 67/243 |
| | | 264/241 |
| 2016/0236984 A1 | 8/2016 | Riman |

* cited by examiner

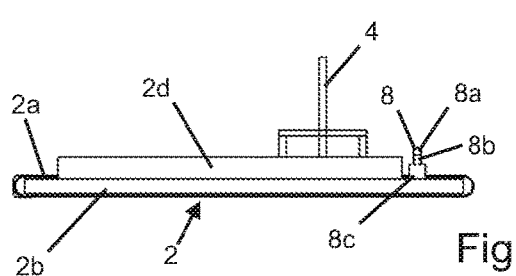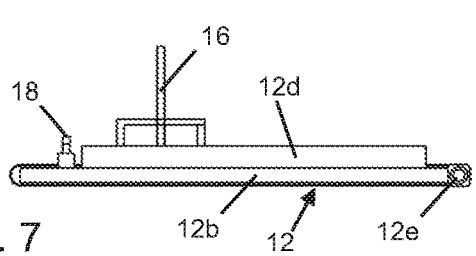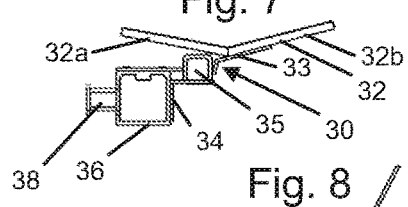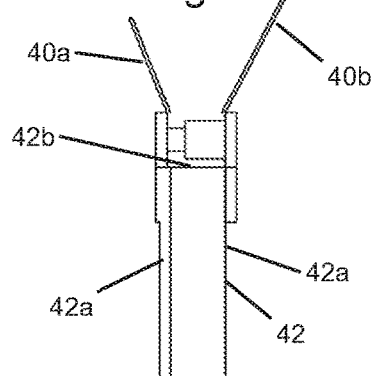

MATERIAL DELIVERY METHOD AND APPARATUS FOR VERTICAL DISTRIBUTION

FIELD OF THE INVENTION

This invention relates to improved methods and apparatus concerning quartz slabs.

BACKGROUND OF THE INVENTION

Quartz is the second most abundant mineral in the Earth's crust and one of the hardest naturally occurring materials. One of its many uses is in "engineered stone". Engineered stone, including quartz, has become a common surfacing and countertop choice in many countries throughout the world. Its applications include kitchen and bathroom countertops, tables and desktops, floor tile, food service areas, wall cladding, and various other horizontal and vertical applications.

The production of engineered stone generally involves particulate materials such as ground quartz rock, crushed glass, rocks, pebbles, sand, shells, silicon, and other inorganic materials combined with polymers, binders, resins, colorants, dyes, etc. The particulate material(s) may be varying sizes ranging from four hundred mesh particle size to four mesh particle size with multiple materials of different sizes used simultaneously. The polymer may include agents to such as a binder, hardener, initiator, or combination of such. The particulate material(s) and polymers, binders, resins, colorants, dyes, etc. are then mixed resulting in a slightly damp mixture. This initial mixture may be processed through a crushing machine to reduce the size of the combined particles. The resultant, finer mixture may be poured into a supporting mold, tray, or other supporting structure, after that, the slab is moved into a vacuumed press machine to be pressed, and then, moved into a curing machine to be cured into a hardened quartz slab. After curing, the slab is generally moved in a grinder to be grinded to a desired thickness, followed by a polisher to finish the product.

Quartz based stone has many advantages over natural stone such as marble and granite. Compared to these natural stones quartz is harder, stronger, less water absorbent, and more resistant to staining, scratching, breakage, chemicals, and heat. One of the drawbacks of quartz is its perceived lack of natural, random looking veins and color patterns compared with natural stones. This invention addresses a method of producing a quartz based slab with single color patterns or multiple color patterns and/or veins.

U.S. Pat. No. 9,511,516 and U.S. patent application Ser. No. 15/854,519 provides a vertical distribution method and apparatus and is incorporated by reference herein.

SUMMARY OF THE INVENTION

One or more embodiments of the present invention provide an apparatus comprising a delivery device including a tray, and a device for changing the tray from a receiving state to a dumping state; a device for supplying one or more materials to the delivery device, while the tray of the delivery device is in a receiving state; a track device including a track and a motor; and a mold having an elongated opening, wherein the delivery device is configured to move back and forth on the track of the track device in response to the motor of the track device; wherein the track of the track device is substantially parallel to the elongated opening of the mold; and wherein the device for changing the tray from the receiving state to the dumping state causes one or more materials to fall from the tray through the elongated opening of the mold into an inner chamber of the mold, when the tray is changed from the receiving state to the dumping state.

The device for changing the tray from the receiving state to the dumping state may cause the tray to rotate.

The tray may include a conveyor belt; and the device for changing the tray from the receiving state to the dumping state may cause the conveyor belt to move.

In at least one embodiment, the tray may include first and second walls; and the device for changing the tray from the receiving state to the dumping state may cause the first and second walls to separate from each other.

The device for supplying one or more materials to the delivery device may include: a first conveyor device having a first conveyor belt; and a second conveyor device having a second conveyor belt.

The device for supplying one or more materials to the delivery device may include: a first mixing device configured to mix a first material located on the first conveyor belt; and a second mixing device configured to mix a second material, different from the first material, and located on the second conveyor belt.

The device for supplying one or more materials to the delivery device may include a first gate device configured to limit the height of a first material located on the first conveyor belt; and a second gate device configured to limit the height of a second material, different from the first material, and located on the second conveyor belt.

The tray may include a first section and a second section; wherein the first section is at an angle of greater than one hundred and thirty-five degrees, and less than one hundred and eighty degrees with respect to the second section.

In at least one embodiment of the present invention a method is provided comprised of receiving one or more materials on a tray of a delivery device during a receiving state, while the delivery device is at a first location with respect to a mold; moving the delivery device along a track to a second location with respect to the mold, which is different from the first location; and dumping the one or more materials from the tray of the delivery device into the mold during a dumping state. The tray may comprised of various components described above and as follows and may be changed from the receiving state to the dumping state as described above and as follows in the present application.

BRIEF DESCRIPTION OF THE DRAWINGS

FIG. 5 shows a front view of some of the components of the apparatus of FIG. 1, including a first conveyor device, a first mixing device, and a first gate device;

FIG. 6 shows a front view of some of the components of the apparatus of FIG. 1, including a second conveyor device, a second mixing device, and a second gate device;

FIG. 7 shows a front view of some of the components of the apparatus of FIG. 1, including the delivery device and the track device;

FIG. 8 shows a front view of some of the components of the apparatus of FIG. 1, including a funnel device and a mold device;

DETAILED DESCRIPTION OF THE DRAWINGS

Figure 1:
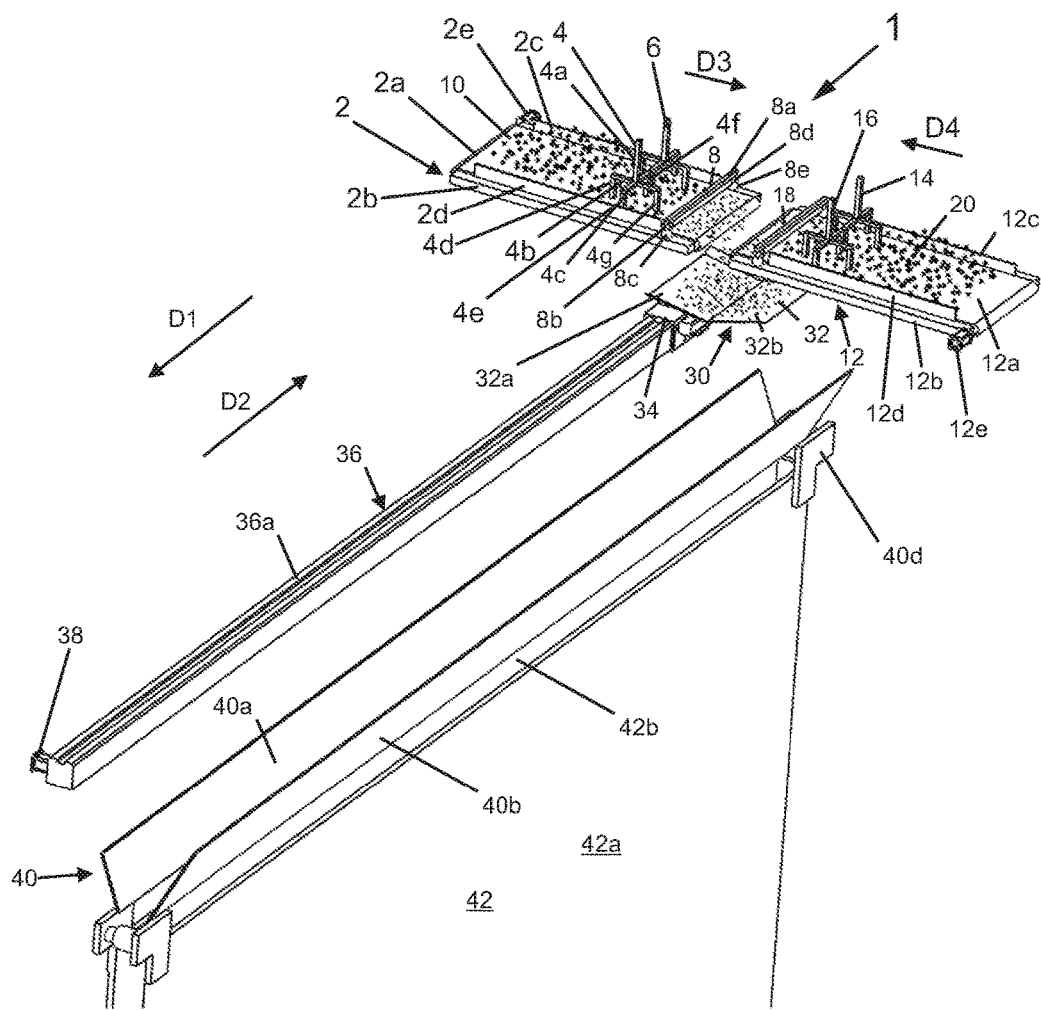
FIG. 1 shows a simplified front, top, and right side perspective view of an apparatus in accordance with an embodiment of the present invention with the apparatus of FIG. 1 shown in a first state.

FIG. 1 shows a simplified front, top, and right side perspective view of an apparatus 1 in accordance with an embodiment of the present invention with the apparatus 1 of FIG. 1 shown in a first state or a receiving state.

The apparatus 1 includes a conveyor device 2, a mixing or stirring device 4, a mixing or stirring device 6, a gate device 8, a conveyor device 12, a mixing or stirring device 14, a mixing or stirring device 16, and a gate device 18. The apparatus 1 also includes a delivery device 30, a track device 36, a funnel device 40, and a mold 42.

The conveyor device 2 includes a conveyor belt 2a, a platform, base, or plate 2b, walls 2c and 2d, and conveyor device motor 2e. Similarly or identically, the conveyor device 12 includes a conveyor belt 12a, a platform, base, or plate 12b, walls 12c and 12d, and conveyor device motor 12e.

The mixing or stirring device 4 includes central shaft 4a, horizontal members 4b and 4c, which are perpendicular to the central shaft 4a, and vertical members 4d, 4e, 4f, and 4f, which are fixed to the horizontal members 4b and 4c, and which are perpendicular to the horizontal members 4b and 4c, and parallel to the central shaft 4a. The mixing or stirring device 4 may include a motor for causing the mixing or stirring device 4 to rotate about the central shaft 4a for mixing material 10 on the belt 2a. The mixing or stirring device 4 may be controlled by a computer processor 202 shown in FIG. 11. The computer processor 202 may control the speed at which the central shaft 4a rotates. The computer processor 202 may also control the height of the stirring device 4 in order to level the pile of the material 10 moving toward to the member 8a of the gate device 8.

The mixing or stirring devices 6, 14, and 16 may be identical to the mixing device 4 and may be controlled by the computer processor 202, independently from each other, but in a similar or identical manner.

The track device 36 may include a track device servo motor 38 which causes the delivery device 30 to move in the directions of D1 or D2 along the track 36a.

Figure 3:
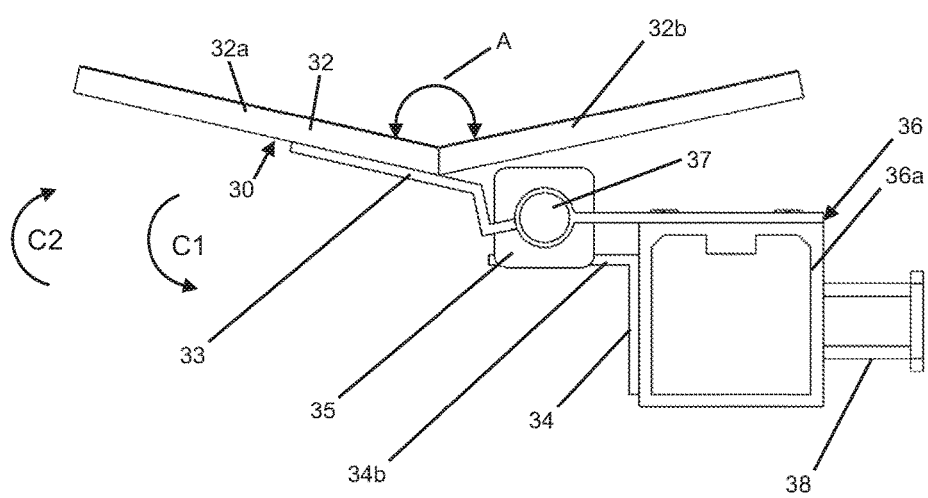
FIG. 3 shows a simplified rear view of some of the components of the apparatus of FIG. 1, shown in the first state, including a delivery device and a track device.

The delivery device 30 includes a tray or plate 32 having a section 32a at an angle A to a section 32b, as shown in FIG. 3, where the angle A may less than one hundred and eighty degrees and greater than zero degrees. In at least one embodiment it is critical that the angle A be less than one hundred and eighty degrees, and greater than one hundred thirty-five degree to allow a significant amount of material to be easily dropped onto the plates or sections 32a and 32b, and to use the angle A, to keep material from falling off of the sections 32a and 32b.

Generally, the sections 32a and 32b of the tray or plate 32 are used to help to prevent material from spilling out from the two sections 32a and 32b of the tray or plate 32 when the plate or tray is receiving materials 10 and 20 from the belts 2a and 12a, respectively, or during the fast movement along the track 36a of the track device 36 when delivering the combined mixed material into the vertical positioned mold or mold device 42.

Figure 2:
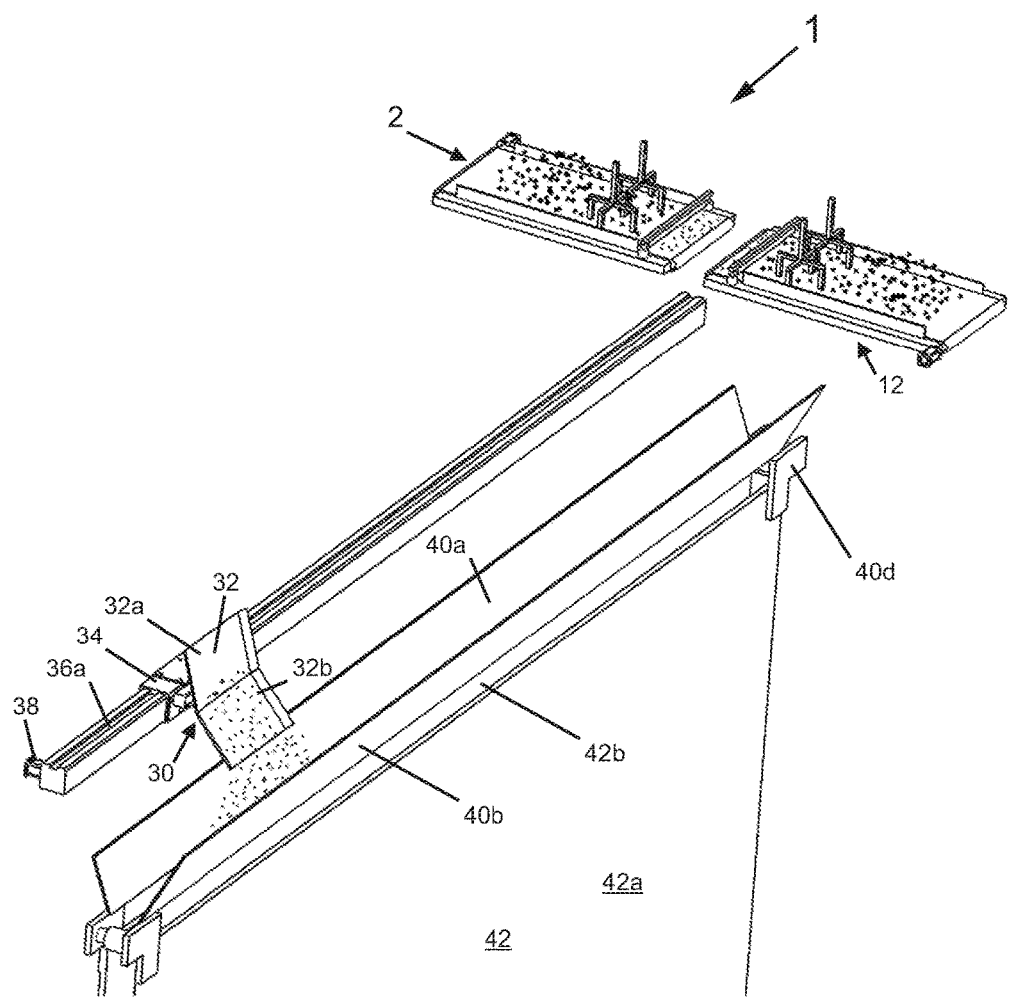
FIG. 2 shows a simplified front, top, and right side perspective view of the apparatus of FIG. 1 in a second state.

The delivery device 30 also includes a member 33 connected at one end to the tray or plate 32 and at its opposite end to a hinge or pivot device 37. The delivery device 30 may further include a servo motor 35 which is controlled by the computer processor 202 to rotate the member 33 at any degree between receiving state degree and full dumping state degree in the clockwise C2 or counterclockwise C1 directions as shown in FIG. 3, in order to rotate the tray or plate 32 to place the tray or plate 32 in either an almost-full dumping state as shown in FIG. 2 or a material receiving state as shown in FIG. 1, or any of half-dumping positions in between during the material delivery process. Also, if desired, the tray or plate 32 can be rotated to various orientations, between the orientation of the receiving state shown in FIG. 1 and the orientation of a full dumping state. The tray or plate 32 and device 34 can be moved or translated to any point or location along the track 36a. The tray or plate 32 can be turned a small degree and quick stopped to cause the tray or plate 32 to have a vibration action to help to have an even drop of materials at certain locations of the track 36a corresponding to certain locations along the length of the opening 42b of the mold or mold device 42.

The delivery device 30 includes a member or device 34 which rides on the track or rail 36a of the track device 36. The member or device 34 includes a section 34b. The member 34 is connected to the hinge 37, the servo motor 35, the member 33, and the tray or plate 32. So when the member 34 moves along the track 36a in the directions D1 or D2 shown in FIG. 1, the components 32, 33, 35, and 37 also move along the track 36a.

The funnel device 40 includes walls or members 40a and 40b. The mold 42 may be an open box, with an opening 42b at the top and having a housing 42a, only part of which is shown in FIG. 1.

The funnel device 40 is lowered into position during fill of the vertical mold 42. In addition, after the vertical mold 42 is filled with material, the funnel device 40 is raised so that the vertical mold 42 can be rotated to a horizontal position.

FIG. 1 shows a receiving state, wherein a first material 10 is moved by the belt 2a in the direction D3, which may be perpendicular to the directions D1 and D2. The first material 10 is mixed by the stirring devices 4 and 6, and then its height is controlled by a member 8a of the gate device 8. The gate device 8 includes member 8a which may be perpendicular to the length of the elgonated conveyor belt 2a, and includes posts 8b and 8d, which are moved up or down above the conveyor belt 2a by components 8c and 8e respectively. The computer processor 202 may control the gate device 8 by controlling the components 8c and 8e, which may control the heights of posts 8b and 8d to control the height of member 8a above the conveyor belt 2a. The member 8a may be controlled to be parallel to the width of the elongated conveyor belt 2a which has a length greater than its width. The length of the conveyor belt 2a may be in the direction of movement D3.

After the first material 10 passes under gate member 8a, between gate member 8a and conveyor belt 2a, the material thereafter falls down onto the tray or plate 32. The angled members or sections 32a and 32b function to keep the material 10 from falling off of the tray or plate 32.

Similarly or identically, FIG. 1 shows a receiving state, wherein a second material 20, different from the first material, is moved by the belt 12a in the direction D4, opposite the direction D3, which may be perpendicular to the directions D1 and D2. The second material 20 is mixed by the stirring devices 14 and 16, and then its height is controlled by a member, analogous to member 8a of the gate device 18. The gate device 18 includes member analogous to member 8a which may be perpendicular to the length of the elongated conveyor belt 12a, and includes posts, analogous to posts 8b and 8d, which are moved up or down above the conveyor belt 12a by components analogous to members 8c and 8e respectively. The computer processor 202 may control the gate device 18 by controlling the components analogous to components 8c and 8e, which may control the heights of posts analogous to 8b and 8d to control the height of a member analogous to member 8a above the conveyor belt 12a. The member of gate device 18 analogous to member 8a, may be controlled to be parallel to the width of the elongated conveyor belt 12a which has a length greater than its width. The length of the conveyor belt 12a may be in the direction of movement D4.

After the second material 20 passes under the gate member of gate device 18, analogous to member 8a, between the gate member analogous to member 8a and the conveyor belt 12a, the second material 20 thereafter falls down onto the tray or plate 32. The angled members or sections 32a and 32b function to keep the material 20 from falling off of the tray or plate or 32.

The first material 10 and the second material 20 combine on the tray or plate 32, or in the air while being dropped from the conveyor belts 2a and 12a. The distance of the belt 2a and the belt 12a traveled, in at least one embodiment, is controlled by the computer processor 202 as programmed by computer software stored in computer memory 204, such as through servo motors of first conveyor device motor 2e and second conveyor device motor 12e. The precise amount of the material 10 and/or the material 20 dropped by belt 2a and belt 12a onto tray 32 and the exact time during which the material 10 and/or the material 20 is dropped onto the tray or plate 4, in at least one embodiment, is controlled by computer processor 202, as programmed by computer software stored in computer memory 204, by use of servo motors of first conveyor device motor 2e, and second conveyor device motor 12e, and the height of the members 8a and 18a, of the gate devices 8 and 18, respectively, is also controlled by the computer processor 202, as programmed by computer software stored in the computer memory 204.

In operation, the computer processor 202 can control the motor 38 of the track device 36 to move the delivery device 30 to the location shown in FIG. 1, so that the delivery device 30 can receive a certain amount of the combination of the first material 10 and/or the second material 20 on the tray or plate 32. After a predetermined amount of a combination of the first material 10 and/or the second material 20, such as determined by computer program stored in the computer memory 204, and executed by the computer processor 202, have accumulated on a top surface of the tray or plate 32, the computer processor 202 can control the delivery device 30 to move it in the direction D1, or D2 depending on the location of the delivery device 30, to a certain location along the track 36a of the track device 36 with respect to the mold 42 where the combination material can be deposited through the opening 42b into the mold 42. Moving the delivery device 30 along the track 36a of the track device 36 with respect to the mold 42, as opposed to moving the conveyor device 2 and the conveyor device 12, takes much less energy and results in substantial savings. The conveyor device platform or base 2b and the conveyor device platform or base 12b are typically heavy structures, and it is critical in at least one embodiment that they remain fixed for better efficiency.

FIG. 2 shows a simplified front, top, and right side perspective view of the apparatus 1 of FIG. 1 in a second or delivery state. The track device 36 may include a high speed synchronous belt linear module and may be driven by a servo motor, such as motor 38 controlled by computer processor 202, in the directions of D1 or D2, such as programmed by computer software stored in the computer memory 204.

FIG. 3 shows a simplified rear view of some of the components of the apparatus 1 of FIG. 1, shown in the first state, including a delivery device 30 and a track device 36.

Figure 4:
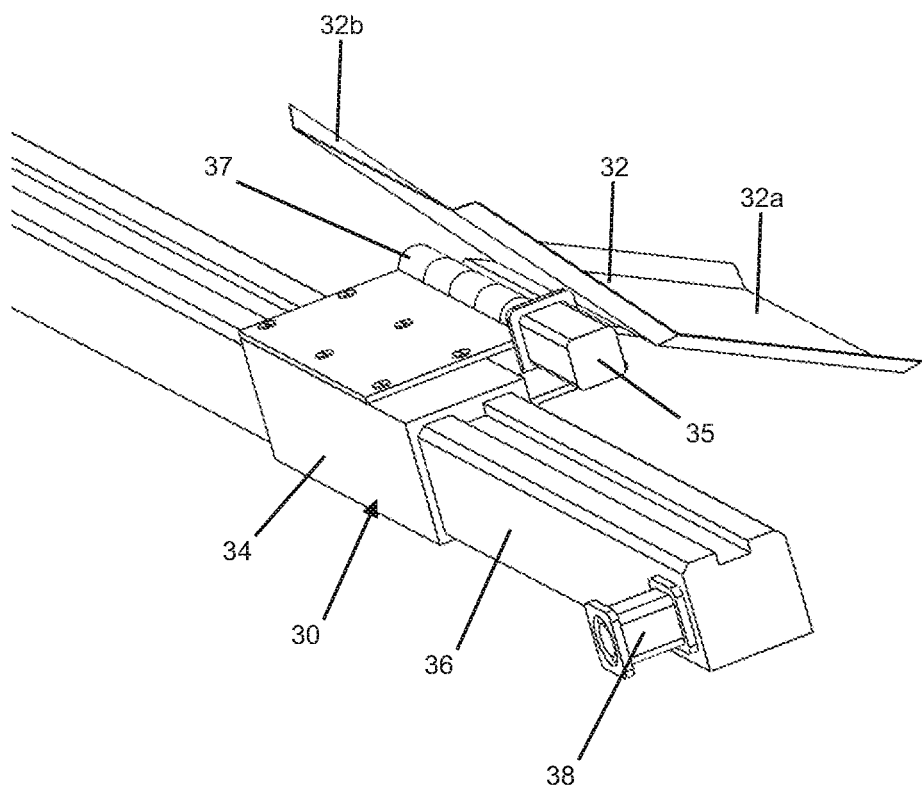
FIG. 4 shows a simplified front, top, and left side view of some of the components of the apparatus of FIG. 1 shown in the second state, including the delivery device and the track device.

FIG. 4 shows a simplified front, top, and left side view of some of the components of the apparatus 1 of FIG. 1 shown in the second state, including the delivery device 30 and the track device 36, with the delivery device 30 shown in a delivery or second state.

FIG. 5 shows a front view of some of the components of the apparatus 1 of FIG. 1, including the first conveyor device 2, the mixing or stirring device 4, and the gate device 8.

FIG. 6 shows a front view of some of the components of the apparatus 1 of FIG. 1, including a second conveyor device 12, a mixing or stirring device 16, and the gate device 16.

FIG. 7 shows a front view of some of the components of the apparatus 1 of FIG. 1, including the delivery device 30 and the track device 36.

FIG. 8 shows a front view of some of the components of the apparatus 1 of FIG. 1, including the funnel device 40 and the mold device 42.

Figure 9:
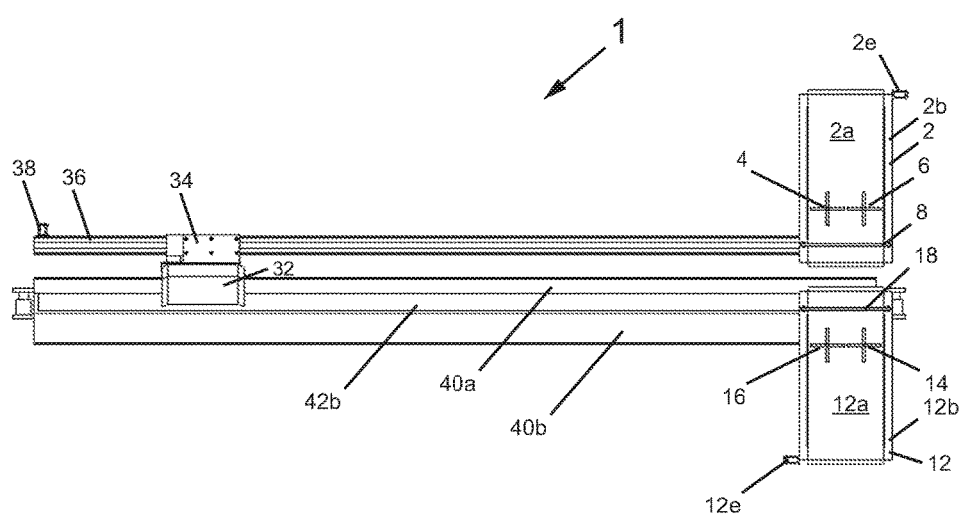
FIG. 9 shows a simplified top view of the apparatus of FIG. 1 in the first state.

FIG. 9 shows a simplified top view of the apparatus 1 of FIG. 1 in the first state or receiving state.

Figure 10:
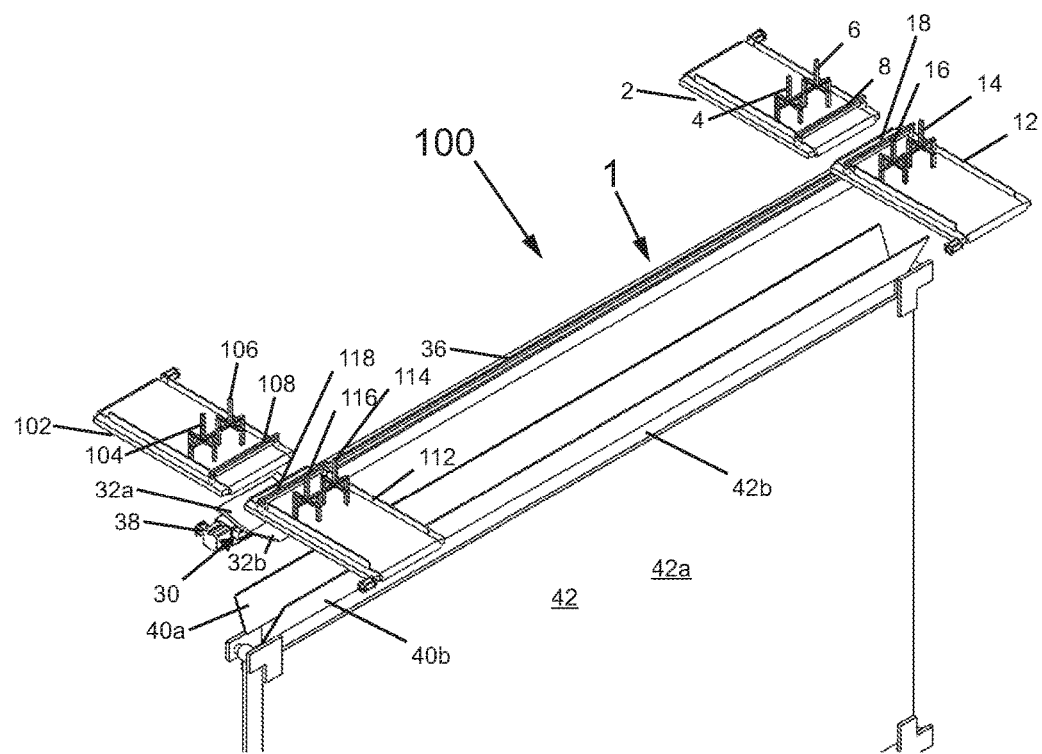
FIG. 10 shows a simplified front, top, and right side perspective view of another apparatus in accordance with an embodiment of the present invention with the apparatus of FIG. 10 shown in a third state, wherein the apparatus of FIG. 10 includes the apparatus of FIG. 1 and additional components.

FIG. 10 shows a simplified front, top, and right side perspective view of apparatus 100 in accordance with an embodiment of the present invention with the apparatus 100 of FIG. 10 shown in a third state, wherein the apparatus 100 of FIG. 10 includes the apparatus 1 of FIG. 1 and additional components.

In FIG. 10, in addition to the apparatus 1, the apparatus 100 also includes conveyor device 102, stirring devices 104 and 106, gate device 108, conveyor device 112, stirring devices 114 and 116, and gate device 118. The conveyor devices 102 and 112 may be similar or identical to the conveyor devices 2 and 12. The stirring devices 104, 106, 114, and 116 may be similar or identical to the stirring or mixing devices 4, 6, 14, and 16. The gate devices 108 and 118 may be similar or identical to the gate devices 8 and 18. The conveyor devices 102 and 112 and related components are provided to allow a twice fast receiving material and delivery material process, or a third material and a fourth material to be provided to the member 32 of the delivery device 30 and thereafter the delivery device 30 can be moved by motor 38 by control of the computer processor 202 to an appropriate location along the length of the track 36a, and with respect to the length of the opening 42b of the mold or mold device 42.

The track device 36 may include a high speed synchronous belt linear module and may be driven by a servo motor, such as motor 38 controlled by computer processor 202, in the directions of D1 or D2.

Figure 11:
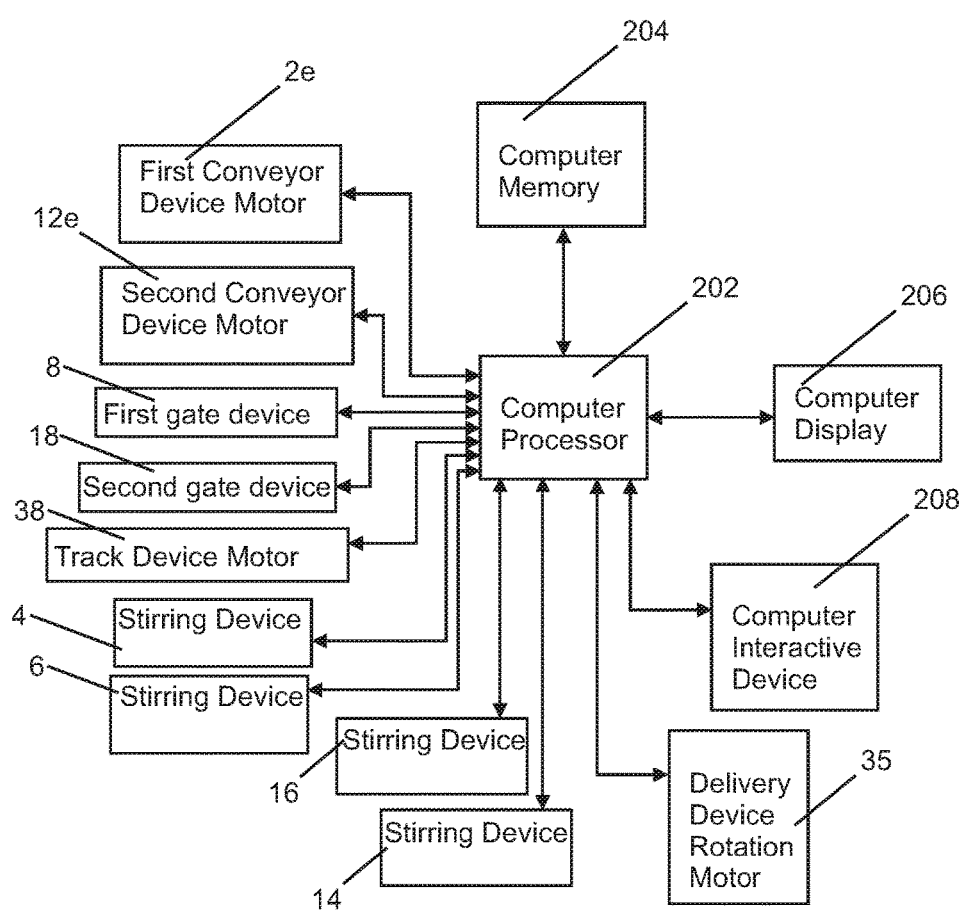
FIG. 11 shows a simplified block diagram of a computer processor and components which communicate with the computer processor.

FIG. 11 shows a simplified block diagram of the computer processor 202 and components which communicate with the computer processor 202. The computer processor 202 communicates with a computer memory 204, a computer display 206, and a computer interactive device 208, which may include a computer mouse or computer keyboard.

The computer processor 202 also communicates with and can control the first conveyor device servo motor 2e, the second conveyor device servo motor 12e, the gate devices 8 and 18, the track device servo motor 38, stirring devices 4, 6, 8, and 18, and the delivery device rotation servo motor 35 which causes certain amount of a combination of materials to be dumped at any position along the track 36 into the mold device or mold 42 through the opening 42b. The computer processor 202 may also control the conveyor device servo motors of the conveyor devices 102 and 112, the stirring devices 104, 106, 114, and 116, and gate devices 108 and 118.

In at least one embodiment, the conveyor devices 102 and 112, along with related components (104, 106, and 108 for conveyor device 102 and 114, 116, and 118 for conveyor device 112) can be placed above the conveyor devices 2 and 12, respectively to mix four material in air or on the tray 32, to add third and/or fourth color materials to a mixture which is dropped onto tray 32.

In at least one embodiment of the present invention, the apparatus 1 or the apparatus 100 or an apparatus with additional conveyor devices above conveyor devices 2 and 12 may deliver a thin line of a combined material into the mold or mold device 42 by moving the tray 32 and device 34 along the track 36a, and at the same time gradually turning the tray 32 from receiving level, shown in FIG. 1, to a full-dumping level, at the finishing point, as programmed by computer software stored in the computer memory 204, and as executed by the computer processor 202. For example, a servo motor of the delivery device rotation motor 35 turning the tray 32 can incrementally turn a small amount at a time, such as a degree or a fraction of a degree at a time, and sudden start and sudden stop kind of stop-and-go action can cause the tray 32 with the combination material to vibrate or shake, in order to have a relatively consistent amount of the combination material dropped into the opening 42b of the mold 42, at a certain location along the length of the opening 42b, as programmed by computer software stored in the computer memory 204 and executed by the computer processor 202.

Figure 12:
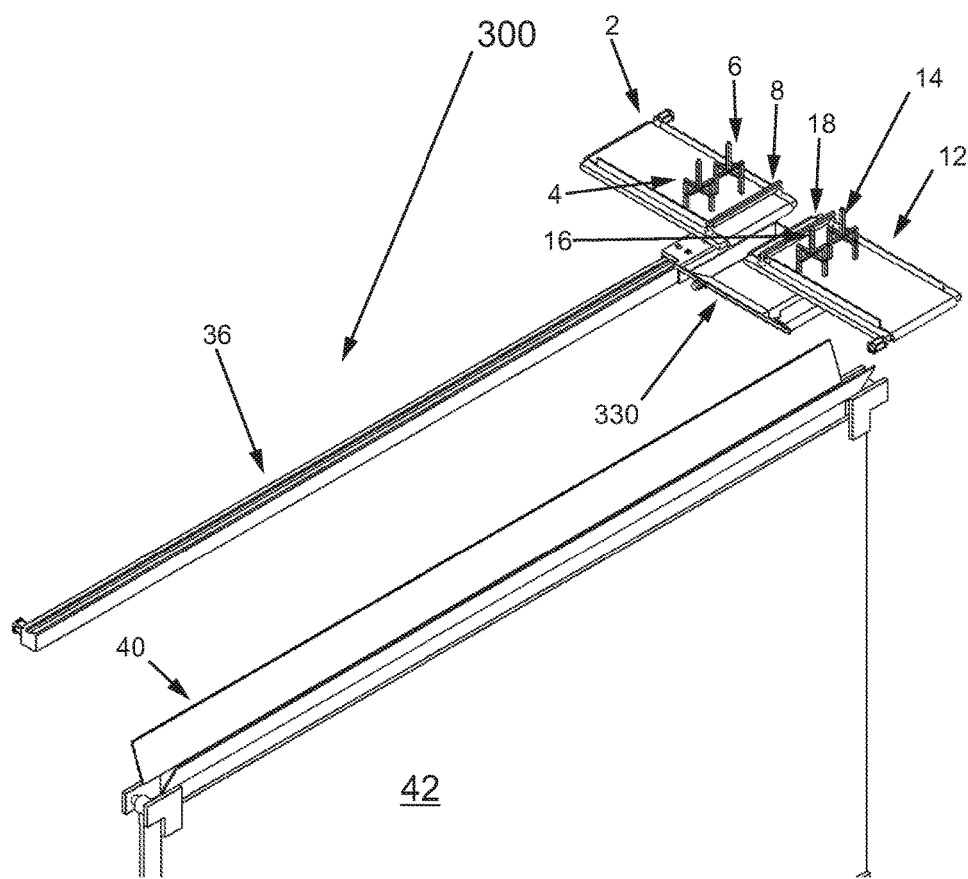
FIG. 12 shows a perspective view of an apparatus in accordance with another embodiment of the present invention, with the apparatus of FIG. 12 shown in a receiving state.
Figure 13:
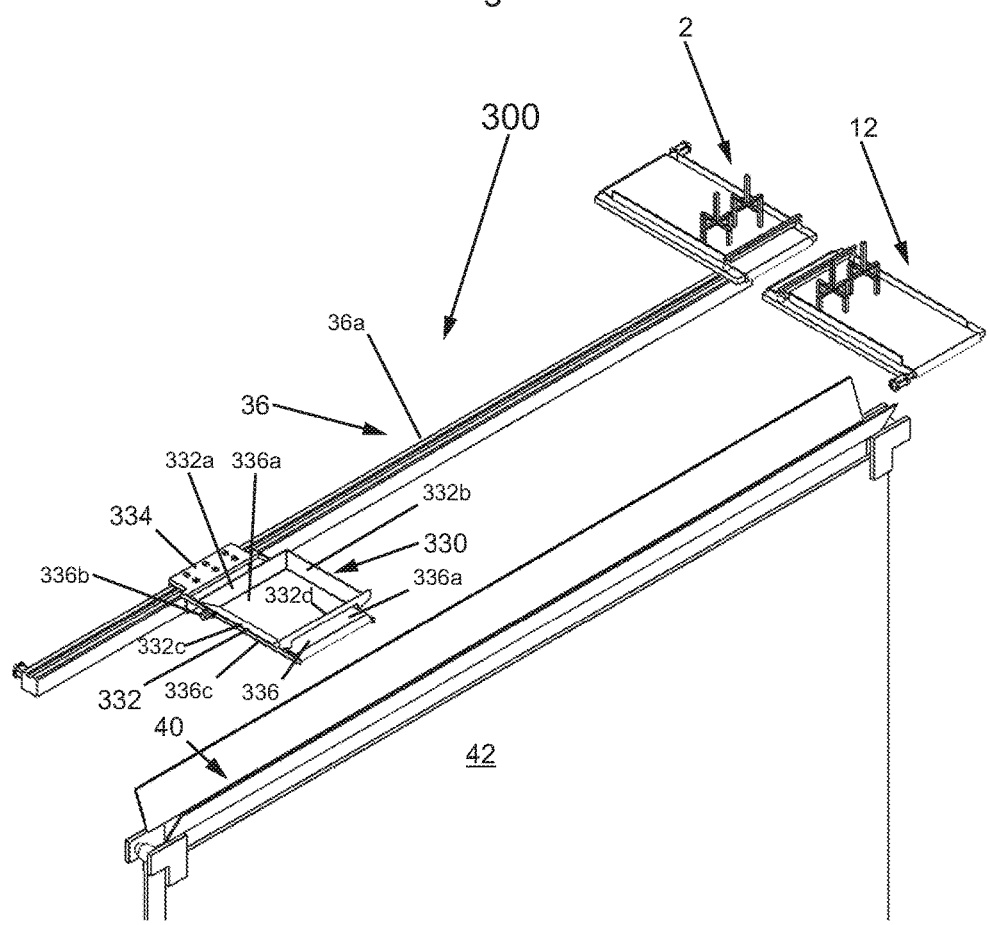
FIG. 13 shows a perspective view of the apparatus of FIG. 12 shown in an altered state.
Figure 14:
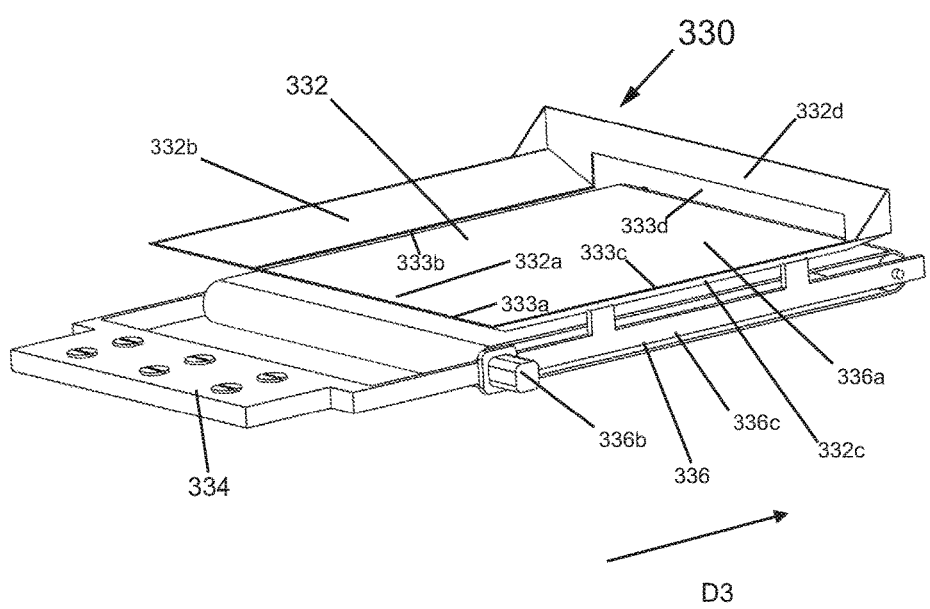
FIG. 14 shows a perspective view of part of the apparatus of FIG. 12

FIG. 12 shows a perspective view of an apparatus 300 in accordance with another embodiment of the present invention, with the apparatus 300 of FIG. 12 shown in a receiving state. FIG. 13 shows a perspective view of the apparatus 300 of FIG. 12 shown in an altered state. FIG. 14 shows a perspective view of part of the apparatus 300 of FIG. 12.

The apparatus 300 may be the same as the apparatus 1 of FIG. 1 except as will be described. The apparatus 300 includes the conveyor device 2, the mixing or stirring device 4, a the mixing or stirring device 6, the gate device 8, the conveyor device 12, the mixing or stirring device 14, the mixing or stirring device 16, and the gate device 18. The apparatus 1 also includes the track device 36, the funnel device 40, and the mold 42.

However, instead of delivery device 30 as in FIG. 1, the apparatus 300 has delivery device 330, which is moved by track device 36. The delivery device 330, as shown by FIG. 14, includes a tray 332, a member 334, and a conveyor device 336. The tray 332 includes a wall 332a, a wall 332b, a wall 332c, and a wall 332d. The walls 332a-d may be angle, such as preferably at a one hundred and thirty five degree angle with respect to bottom or belt 336a. In at least one embodiment, there are small gaps 333a-c between the walls 332a-c and the bottom or belt 336a. The walls 332a-c are fixed to member 336c of conveyor device 336. The member 336c is fixed to member 334 and if the member 334 is stationary, then the member 336c is also stationary.

There is a gap 333d between the wall 332d and the bottom or belt 336a. The gap 333d is much greater than the gaps 333a-c. The conveyor device 336 includes a motor 336b which may be controlled by a computer processor, such as computer processor 202 shown in FIG. 11, in accordance with a computer program stored in the computer memory 204.

The belt 336a, in a sense forms the bottom of the tray 332, or one can think of the tray 332 as having no bottom. In operation, materials are dropped by the conveyor devices 2 and 12 onto the belt 336a, within the perimeter defined by the walls 332a-d, typically while the belt 336a is not moving, in the state shown in FIG. 12. After a desired amount of materials are dropped onto the belt 336a, within the perimeter defined by walls 332a-d, the delivery device 330 is moved by the track device 36, along the track 36a, such as to a position shown by FIG. 13. After the delivery device 330 has reached a desired position with respect to the funnel device 40 and the mold 42, as controlled by the computer processor 202, in accordance with a computer program stored in computer memory 204, the belt 336a is caused to rotate clockwise by the motor 336b by the computer processor 202, while member 334 is stationary. The rotation of the belt 336a, causes the portion of the belt 336a within the perimeter of walls 332a-d to initially move in the D3 direction shown in FIG. 14, which causes material on that portion of the belt 336a to move through the gap 333d and under the wall 332d, and to drop off the belt 336a and then fall down into the mold 42.

The gaps 333a-c, between the walls 332a-c and a top portion of the belt 336a, may be very small, such as about ¼ inches to just allow the top portion of the belt 336a to not rub against the bottom edges of the walls 332a-c. The gap 333d allowing passage of materials under the wall 332d, may be about one inch or could be adjusted.

Figure 15:
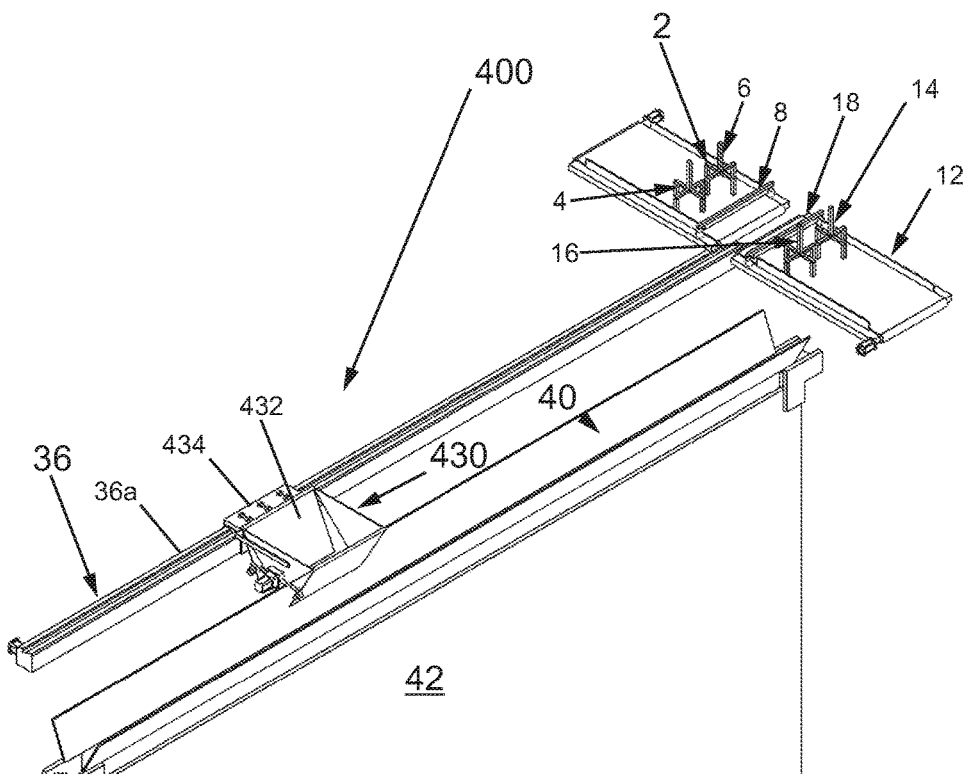
FIG. 15 shows a perspective view of an apparatus in accordance with another embodiment of the present invention, with the apparatus of FIG. 15 shown in a delivery state.
Figure 16:
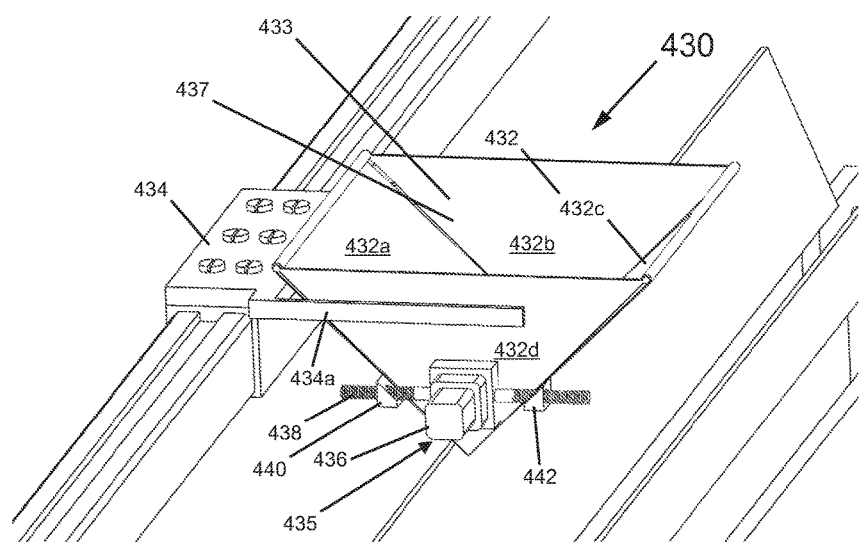
FIG. 16 shows a perspective view of part of the apparatus of FIG. 15.
Figure 17:
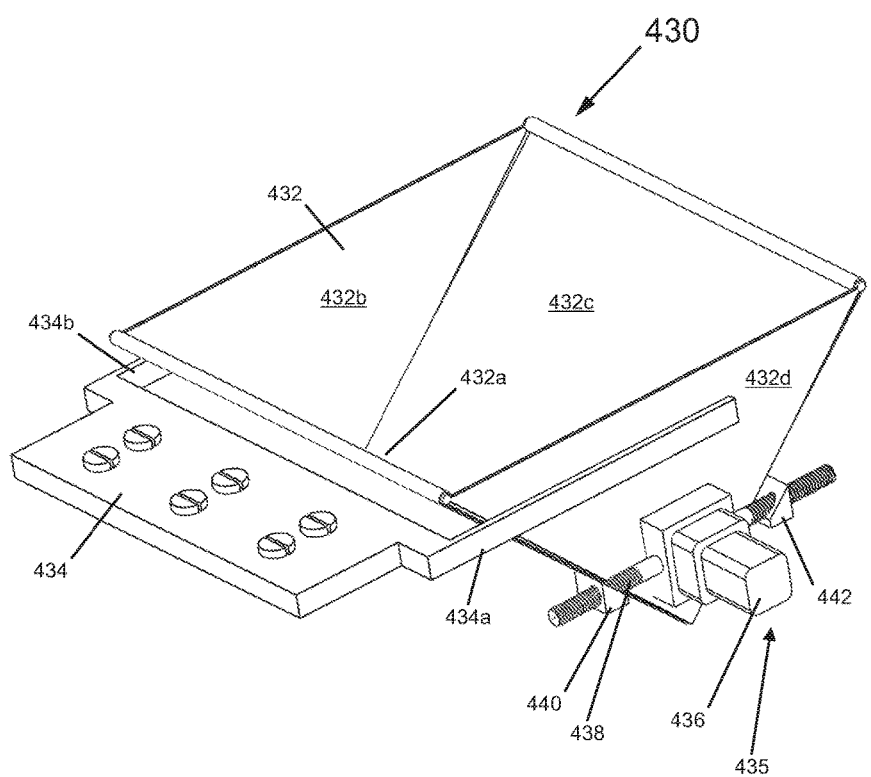
FIG. 17 shows a perspective view of part of the apparatus of FIG. 15.

FIG. 15 shows a perspective view of an apparatus 400 in accordance with another embodiment of the present invention, with the apparatus 400 of FIG. 15 shown in a delivery state. FIG. 16 shows a perspective view of part of the apparatus 400 of FIG. 15. FIG. 17 shows a perspective view of another part of the apparatus 500 of FIG. 15.

The apparatus 400 may be the same as the apparatus 1 of FIG. 1 except as will be described. The apparatus 400 includes the conveyor device 2, the mixing or stirring device 4, a the mixing or stirring device 6, the gate device 8, the conveyor device 12, the mixing or stirring device 14, the mixing or stirring device 16, and the gate device 18. The apparatus 400 also includes the track device 36, the funnel device 40, and the mold 42.

However, instead of delivery device 30 as in FIG. 1, the apparatus 400 has delivery device 430, which is moved by track device 36. The delivery device 430, as shown by FIG. 16, includes a tray 432, a member 434, and an opening device 435. The tray 432 includes a wall 432a, a wall 432b, a wall 432c, and a wall 432d. The walls 432b and 432d may be triangular plates, such as metal plates. The walls 432a and 432c may be rectangular plates, such as metal plates.

The walls 432a-d may together form a triangular prism with an opening 433 at the top, leading to an inner chamber 437, in the orientation shown in FIG. 16. The triangular prism formed by walls 432a-d shown in FIG. 16, is sealed or closed or substantially sealed or closed, in the orientation of FIG. 16, so that the materials falling through the opening 433 and into the inner chamber 437 do not fall out of the tray or container 432.

In FIG. 16, the rectangular wall 432a has one edge which contacts an edge of the wall 432b, one edge which contacts an edge of the wall 432d, one edge which contacts an edge of the wall 432c, and a top edge which does not contact a wall.

In FIG. 16, the rectangular wall 432c has one edge which contacts an edge of the wall 432b, one edge which contacts an edge of the wall 432d, and one edge which contacts an edge of the wall 432a, and a top edge which does not contact a wall.

In FIG. 16, the triangular wall 432b has one edge which contacts an edge of the wall 432a, one edge which contacts an edge of the wall 432c, and a top edge which does not contact a wall.

In FIG. 16, the triangular wall 432d has one edge which contacts an edge of the wall 432a, one edge which contacts an edge of the wall 432c, and a top edge which does not contact a wall.

The triangular wall 432d is fixed to member 434a of the member 434 which rides or moves on the track 36a of the track device 36. Similarly the triangular wall 432b is fixed to member 434b of the member 434 which rides or moves on the track 36a of the track device 36 as shown by FIG. 17 and FIG. 15.

The opening device 435 of the delivery device 430 includes a motor 436, a threaded member 438, a nut 440, and a nut 442. The motor 436 is controlled by the computer processor 202 as programmed by computer memory 204, such as through computer interactive device 208, to cause the walls 432a and 432c to rotated and thereby create a bottom opening to allow materials to fall through the tray device 432, as shown by FIG. 15. When the threaded member 438 is rotated by the motor 436, it causes the nuts 440 and 442 which are fixed on the outside of walls 432a and 432c, respectively, to be driven further apart, and to thereby create a bottom opening as in FIG. 15. In FIG. 15, the bottom edges of walls 432a and 432c no longer touch each other, and side edges of walls 432a and 432c are no longer aligned with edges of triangular walls 432b and 432d, which create a bottom opening in device 432, through which material is dropped into mold 42. Note that typically, in at least one embodiment, one top vertex of the wall 432a is fixed to one top vertex of the triangular wall 432d and the opposite top vertex of the wall 432 is fixed to on top vertex of the triangular wall 432b so that the wall 432a rotates with respect to the triangular walls 432b and 432d. Similarly or identically, in at least one embodiment, one top vertex of the wall 432c is fixed to one top vertex of the triangular wall 432d and the opposite top vertex of the wall 432 is fixed to one top vertex of the triangular wall 432b so that the wall 432a rotates with respect to the triangular walls 432b and 432d. There may be an axle running along the top edge of the wall 432a and an axle running along the top edge of the wall 432c for enabling rotation of the walls 432a and 432c with respect to triangular walls 432b and 432d.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising:
a delivery device including a tray;
a device for supplying one or more materials to the delivery device;
a track device including a track and a motor;
a mold having an opening; and
a computer processor;
wherein the delivery device is configured to move back and forth on the track of the track device in response to the motor of the track device;
wherein the track of the track device is substantially parallel to a length of the opening of the mold;
wherein the computer processor is programmed to cause the delivery device to stop at a plurality of locations with respect to the length of the opening of the mold and to cause the delivery device to deposit one or more materials from the delivery device into the mold through the opening at the plurality of locations;
wherein the tray includes a conveyor belt;
the tray includes a first wall, and a second wall;
wherein the first wall of the tray is fixed a first distance above the conveyor belt;
wherein the second wall of the tray is fixed a second distance above the conveyor belt;
wherein the second distance is substantially greater than the first distance;
wherein there is a gap between the second wall of the tray and the conveyor belt, which has a height of the first distance; and
wherein the one or more materials is configured to be supplied into the mold through the opening of the mold by movement of the conveyor belt, and by the one or more materials passing through the gap between the second wall of the tray and the conveyor belt of the tray, and then falling into the mold through the opening of the mold.

2. The apparatus of claim 1 wherein
the computer processor is programmed to cause movement of the delivery device along the track from a first location with respect to the length of the opening of the mold to a second location, which is different from the first location with respect to the length of the opening of the mold without dropping substantially any of the one or more materials into the opening of the mold during the movement from the first location to the second location.

3. The apparatus of claim 1 wherein
the delivery device has a length substantially parallel to the length of the opening of the mold;
and wherein the length of the delivery device is substantially less than the length of the opening of the mold.

4. The apparatus of claim 1 wherein
the device for supplying one or more materials to the delivery device includes:
a first conveyor device having a first conveyor belt; and
a second conveyor device having a second conveyor belt.

5. An apparatus comprising:
a delivery device including a tray;
a device for supplying one or more materials to the delivery device;
a track device including a track and a motor;
a mold having an opening; and
a computer processor;
wherein the delivery device is configured to move back and forth on the track of the track device in response to the motor of the track device;
wherein the track of the track device is substantially parallel to a length of the opening of the mold;
wherein the computer processor is programmed to cause the delivery device to stop at a plurality of locations with respect to the length of the opening of the mold and to cause the delivery device to deposit one or more materials from the delivery device into the mold through the opening at the plurality of locations;
wherein the device for supplying one or more materials to the delivery device includes:
a first conveyor device having a first conveyor belt; and
a second conveyor device having a second conveyor belt;
further comprising
a first mixing device configured to mix a first material located on the first conveyor belt; and
a second mixing device configured to mix a second material, different from the first material, and located on the second conveyor belt.

6. The apparatus of claim 2 further comprising
a first gate device configured to limit the height of a first material located on the first conveyor belt; and
a second gate device configured to limit the height of a second material, different from the first material, and located on the second conveyor belt.

7. The apparatus of claim 1 wherein
the tray includes a first section and a second section;
wherein the first section is at an angle of greater than one hundred and thirty-five degrees, and less than one hundred and eighty degrees with respect to the second section.

8. A method comprising the steps of:
receiving one or more materials on a tray of a delivery device during a receiving state, while the delivery device is at a first location with respect to a length of an opening of a mold;
moving the delivery device along a track, which is substantially parallel to the length of the opening of the mold to a second location with respect to the length of the opening of the mold, which is different from the first location; and
using a computer processor to cause the delivery device to stop at a plurality of locations with respect to the length of the opening of the mold and to cause the delivery device to deposit the one or more materials from the delivery device into the mold through the opening of the mold at the plurality of locations; and
wherein the tray includes a conveyor belt;
wherein the tray includes a first wall, and a second wall;
wherein the first wall of the tray is fixed a first distance above the conveyor belt;
wherein the second wall of the tray is fixed a second distance above the conveyor belt;
wherein the second distance is substantially greater than the first distance;
wherein there is a gap between the second wall of the tray and the conveyor belt, which has a height of the first distance; and
wherein the one or more materials is configured to be supplied into the mold through the opening of the mold by movement of the conveyor belt, and by the one or more materials passing through the gap between the second wall of the tray and the conveyor belt of the tray, and then falling into the mold through the opening of the mold.

9. The method of claim 8 wherein
the one or more materials are deposited into the mold through the opening of the mold by rotating the tray.

10. The method of claim 8 wherein
the delivery device has a length substantially parallel to the length of the opening of the mold; and
and wherein the length of the delivery device is substantially less than the length of the opening of the mold.

11. The method of claim 8 further comprising
supplying the one or more materials to the delivery device during the receiving state, with at least a first conveyor device having a first conveyor belt, and a second conveyor device having a second conveyor belt.

12. The method of claim 11 further comprising
mixing a first material located on the first conveyor belt; and
mixing a second material, different from the first material, and located on the second conveyor belt.

13. The method of claim 11 further comprising
controlling a height of a first material located on the first conveyor belt with a first gate device;
and controlling a height of a second material located on the second conveyor belt with a second gate device.

14. The method of claim 8 wherein
the tray includes a first section and a second section;
wherein the first section is at an angle of greater than one hundred and thirty-five degrees and less than one hundred and eighty degrees with respect to the second section.

15. The apparatus of claim 1 wherein
the one or more materials are deposited into the mold through the opening of the mold by rotating the tray.

16. The apparatus of claim 1 wherein
the one or more materials are deposited into the mold through the opening of the mold, at least in part, by stopping the tray to cause a vibration action.

17. The method of claim 8 wherein
the one or more materials are deposited into the mold through the opening of the mold, at least in part, by stopping the tray to cause a vibration action.

* * * * *